(12) United States Patent
Liu

(10) Patent No.: US 11,720,572 B2
(45) Date of Patent: Aug. 8, 2023

(54) METHOD AND SYSTEM FOR CONTENT RECOMMENDATION

(71) Applicant: ADVANCED NEW TECHNOLOGIES CO., LTD., Grand Cayman (KY)

(72) Inventor: Yangyang Liu, Hangzhou (CN)

(73) Assignee: ADVANCED NEW TECHNOLOGIES CO., LTD., George Town (KY)

(*) Notice: Subject to any disclaimer, the term of this patent is extended or adjusted under 35 U.S.C. 154(b) by 285 days.

(21) Appl. No.: 16/911,000

(22) Filed: Jun. 24, 2020

(65) Prior Publication Data

US 2020/0320086 A1    Oct. 8, 2020

Related U.S. Application Data

(63) Continuation-in-part of application No. PCT/CN2018/123283, filed on Dec. 25, 2018.

(30) Foreign Application Priority Data

Jan. 8, 2018   (CN) .......................... 201810015028.0

(51) Int. Cl.
G06F 16/2457     (2019.01)
G06N 20/00       (2019.01)
(Continued)

(52) U.S. Cl.
CPC .. *G06F 16/24573* (2019.01); *G06F 16/24522* (2019.01); *G06F 16/282* (2019.01); *G06F 40/40* (2020.01); *G06N 20/00* (2019.01)

(58) Field of Classification Search
CPC ............. G06F 16/24573; G06F 16/282; G06F 16/24522; G06F 40/40; G06F 16/313;
(Continued)

(56) References Cited

U.S. PATENT DOCUMENTS 6,397,334 B1    5/2002   Chainer
6,925,452 B1    8/2005   Hellerstein
(Continued)

FOREIGN PATENT DOCUMENTS

CN    103442001 A    12/2013
CN    106156204 A    11/2016
(Continued)

OTHER PUBLICATIONS

Hyungtae Lee et al.: "Fast Object Localization Using a CNN Feature Map Based Multi-Scale Search", Arxiv.org, Cornell University Library, 201 Olin Library Cornell University Ithaca, NY 14853, Apr. 12, 2016, XP080695042, Section 3.2, Figure 3.
(Continued)

*Primary Examiner* — Richard L Bowen
*Assistant Examiner* — Aryan D Toughiry
(74) *Attorney, Agent, or Firm* — Seed IP Law Group LLP

(57) ABSTRACT

One embodiment provides a method and system for recommending content to users. During operation, the system can select a content piece from a content library and extract, by a computer using a natural language processing (NLP) technique, one or more keywords from the content piece. The system can determine a domain associated with the content piece based on the extracted keywords and obtain domain knowledge of the determined domain. The system can generate a feature tag for the content piece based on the extracted keywords and the obtained domain knowledge, and generate an attribute tag for a user based on historical data associated with the user. The system can then recommend one or more content pieces from the content library to the user based on feature tags associated with the one or more content pieces and the attribute tag for the user.

20 Claims, 7 Drawing Sheets

(51) Int. Cl.
  *G06F 16/28* (2019.01)
  *G06F 16/2452* (2019.01)
  *G06F 40/40* (2020.01)

(58) Field of Classification Search
  CPC ...... G06F 16/335; G06F 40/30; G06F 16/367;
       G06F 16/9535; G06F 40/216; G06F
       40/247; G06F 40/295; G06N 20/00;
       G06N 5/022
  See application file for complete search history.

(56) References Cited

U.S. PATENT DOCUMENTS

| | | | |
|---|---|---|---|
| 7,093,129 | B1 | 8/2006 | Gavagni |
| 7,401,012 | B1 | 7/2008 | Bonebakker |
| 7,872,584 | B2 | 1/2011 | Chen |
| 8,180,629 | B2 | 5/2012 | Rehberg |
| 8,448,226 | B2 | 5/2013 | Narasimhan |
| 8,966,613 | B2 | 2/2015 | Horvitz |
| 9,036,943 | B1 | 5/2015 | Baldwin |
| 9,582,843 | B2 | 2/2017 | Leonard |
| 9,607,138 | B1 | 3/2017 | Baldwin |
| 10,475,014 | B1 | 11/2019 | Ramalingam |
| 10,554,738 | B1 | 2/2020 | Ren |
| 2001/0046659 | A1 | 11/2001 | Oster |
| 2002/0136459 | A1 | 9/2002 | Imagawa |
| 2003/0229789 | A1 | 12/2003 | Morais |
| 2004/0167765 | A1 | 8/2004 | Abu el Ata |
| 2004/0196363 | A1 | 10/2004 | Diamond |
| 2005/0232424 | A1 | 10/2005 | Dobranski |
| 2009/0087025 | A1 | 4/2009 | Ma |
| 2009/0206993 | A1 | 8/2009 | Di Mambro |
| 2010/0128923 | A1 | 5/2010 | Kiya |
| 2010/0135490 | A1 | 6/2010 | Kwon |
| 2011/0069892 | A1 | 3/2011 | Tsai |
| 2011/0162679 | A1 | 7/2011 | Demmeler |
| 2012/0269346 | A1 | 10/2012 | Best |
| 2013/0015946 | A1 | 1/2013 | Lau |
| 2013/0182002 | A1 | 7/2013 | Macciola |
| 2013/0208103 | A1 | 8/2013 | Sands |
| 2014/0037184 | A1 | 2/2014 | Gorski |
| 2014/0270411 | A1 | 9/2014 | Shu |
| 2014/0309805 | A1 | 10/2014 | Ricci |
| 2014/0313334 | A1 | 10/2014 | Slotky |
| 2014/0337383 | A1* | 11/2014 | Boyle ................... G06F 16/243 707/780 |
| 2015/0036891 | A1 | 2/2015 | Takenouchi |
| 2015/0103170 | A1 | 4/2015 | Nelson |
| 2015/0110364 | A1 | 4/2015 | Niinuma |
| 2015/0110366 | A1 | 4/2015 | Sezille |
| 2015/0294012 | A1* | 10/2015 | DeLuca ............ G06F 16/24522 707/722 |
| 2015/0341370 | A1 | 11/2015 | Khan |
| 2016/0034786 | A1 | 2/2016 | Suri |
| 2016/0044030 | A1 | 2/2016 | Galwas |
| 2016/0063235 | A1 | 3/2016 | Tussy |
| 2016/0205427 | A1 | 7/2016 | Yoon et al. |
| 2016/0283787 | A1 | 9/2016 | Nepomniachtchi |
| 2016/0307029 | A1 | 10/2016 | Vaknin |
| 2017/0048244 | A1 | 2/2017 | Loughlin-McHugh |
| 2017/0060867 | A1 | 3/2017 | Moutinho |
| 2017/0061563 | A1 | 3/2017 | Falkenstern |
| 2017/0083584 | A1* | 3/2017 | Blanco ................... H04B 1/38 |
| 2017/0148102 | A1 | 5/2017 | Franke |
| 2017/0212895 | A1* | 7/2017 | Ahmed ............... G06F 16/3344 |
| 2017/0293679 | A1* | 10/2017 | Boguraev ........... G06F 16/3344 |
| 2017/0293894 | A1 | 10/2017 | Taliwal |
| 2017/0300828 | A1 | 10/2017 | Feng |
| 2018/0018391 | A1 | 1/2018 | Kaji |
| 2018/0047208 | A1 | 2/2018 | Marin |
| 2018/0083973 | A1 | 3/2018 | Paraskevas |
| 2018/0182039 | A1 | 6/2018 | Wang |
| 2018/0247112 | A1 | 8/2018 | Norimatsu |
| 2018/0260793 | A1 | 9/2018 | Li |
| 2018/0300576 | A1 | 10/2018 | Dalyac |
| 2019/0035112 | A1 | 1/2019 | Lee |
| 2019/0073641 | A1 | 3/2019 | Utke |
| 2019/0156178 | A1 | 5/2019 | Thornton |
| 2019/0266015 | A1 | 8/2019 | Chandra |
| 2019/0294878 | A1 | 9/2019 | Endras |
| 2019/0355366 | A1 | 11/2019 | Ng |
| 2020/0005151 | A1 | 1/2020 | Jiang |
| 2020/0034958 | A1 | 1/2020 | Campbell |
| 2020/0050939 | A1 | 2/2020 | Zhu |
| 2020/0051237 | A1 | 2/2020 | Spivey |
| 2020/0175352 | A1 | 6/2020 | Cha |
| 2020/0320086 | A1 | 10/2020 | Liu |
| 2020/0349370 | A1 | 11/2020 | Lambert |

FOREIGN PATENT DOCUMENTS

| | | |
|---|---|---|
| CN | 106897273 A | 6/2017 |
| CN | 108268619 A | 7/2018 |
| WO | 2017059576 | 4/2017 |
| WO | 2018055340 | 3/2018 |

OTHER PUBLICATIONS

Zhou Huabing et al.: "Image Classification Based on Region of Interest Detection", Visual Communications and Image Processing; Jan. 20, 2004; San Jose; vol. 9813, Dec. 14, 2015, pp. 98130U-98130U, XP060063208, paragraph [0001]; figure 1.

W. Samek, T. Wiegand, and K.-R. Muller. (2017). Explainable artificial Intelligence: understanding, visualizing and interpreting deep learning models.: [Online], Available: https://arxiv.org/abs/1708.08296 (Year: 2017).

Jeffery De Dejin, ("Automatic car damage recognition using convolutional neural networks", Internship report MSc Business Analytics Mar. 29, 2018, pp. 1-53, Vrije Universiteit Amsterdam Faculty of Science, Amsterdam)(Year:2018).

* cited by examiner

METHOD AND SYSTEM FOR CONTENT RECOMMENDATION

RELATED APPLICATION

Under 35 U.S.C. § 120 and § 365(c), this application is a continuation-in-part of PCT Application No. PCT/CN2018/123283, entitled "METHOD AND APPARATUS FOR CONTENT RECOMMENDATION," by inventor Yangyang Liu, filed 25 Dec. 2018, which claims priority to Chinese Patent Application No. 201810015028.0, filed on 8 Jan. 2018.

BACKGROUND

Field

The present application relates to a method and system for content recommendation. More specifically, this application relates to a method and system that recommends content to users based on domain knowledge.

Related Art

With the rapid development of mobile computing technology, usage of mobile applications (commonly referred to as apps) has become prevalent across mobile device users. Mobile device users are performing increasingly more activities on their mobile devices, including social networking, shopping, browsing news, playing games, streaming video and audio files for entertainment, managing personal finance, etc. In addition, mobile users are accustomed to obtaining information from mobile applications. For example, instead of traditional media, various online platforms have become the major source of news to mobile device users. Other types of applications (e.g., e-commerce, banking, life-style management, etc.) also provide, in addition to their specific services, useful information to their users.

The vast amount of information that is available on a particular platform (e.g., merchandise information on an e-commerce platform or market information on a finance-management platform) can make it difficult for users to find information that suits their need. Moreover, different users using the same platform may have different information needs, requiring the platform to be able to provide personalized content recommendation. Conventional content-recommendation approaches often lack the ability to accurately match content to the interests of individual users, thus being incapable of providing efficient content recommendation.

SUMMARY

One embodiment provides a method and system for recommending content to users. During operation, the system can select a content piece from a content library and extract, by a computer using a natural language processing (NLP) technique, one or more keywords from the content piece. The system can determine a domain associated with the content piece based on the extracted keywords and obtain domain knowledge of the determined domain. The system can generate a feature tag for the content piece based on the extracted keywords and the obtained domain knowledge, and generate an attribute tag for a user based on historical data associated with the user. The system can then recommend one or more content pieces from the content library to the user based on feature tags associated with the one or more content pieces and the attribute tag for the user.

In a variation on this embodiment, the domain knowledge can include hierarchical domain knowledge that specifics at least: a domain name, a number of categories within the domain, and a number of feature words within each category.

In a further variation, generating the feature tag can include determining a category associated with the content piece, identifying a number of feature words associated with the determined category, and comparing the extracted keywords with the identified feature words associated with the determined category.

In a further variation, generating the feature tag can include identifying an extracted keyword that matches one of the identified feature words associated with the determined category and adding the identified extracted keyword to the feature tag.

In a further variation, the system can rank the extracted keywords based on a result of the comparison between the extracted keywords and the identified feature words associated with the determined category, and add a number of extracted keywords having rankings within a predetermined ranking range to the feature tag.

In a further variation, the extracted keywords are associated with corresponding weight values, and ranking the extracted keywords can include updating the weight values based on the result of the comparison and ranking the extracted keywords based on the updated weight values.

In a variation on this embodiment, the domain knowledge can include one or more domain-knowledge graphs. A respective domain-knowledge graph can include an entity name and a number of attribute words associated with the entity, and the entity name and an attribute word define a feature combination word that is specific to the domain.

In a further variation, generating the feature tag can include comparing the extracted keywords with feature combination words defined by the one or more domain-knowledge graphs, identifying an extracted keyword that matches one of the feature combination words, and adding the identified extracted keyword to the feature tag.

In a variation on this embodiment, generating the attribute tag for the user can include identifying a second content piece that has been read by the user, obtaining a second feature tag for the second content piece, and adding at least a portion of the second feature tag to the attribute tag for the user.

In a variation on this embodiment, obtaining the domain knowledge can include applying a domain-knowledge-based model that has been previously trained using a machine-learning technique.

BRIEF DESCRIPTION OF THE FIGURES

In the figures, like reference numerals refer to the same figure elements.

DETAILED DESCRIPTION

Figure 1:
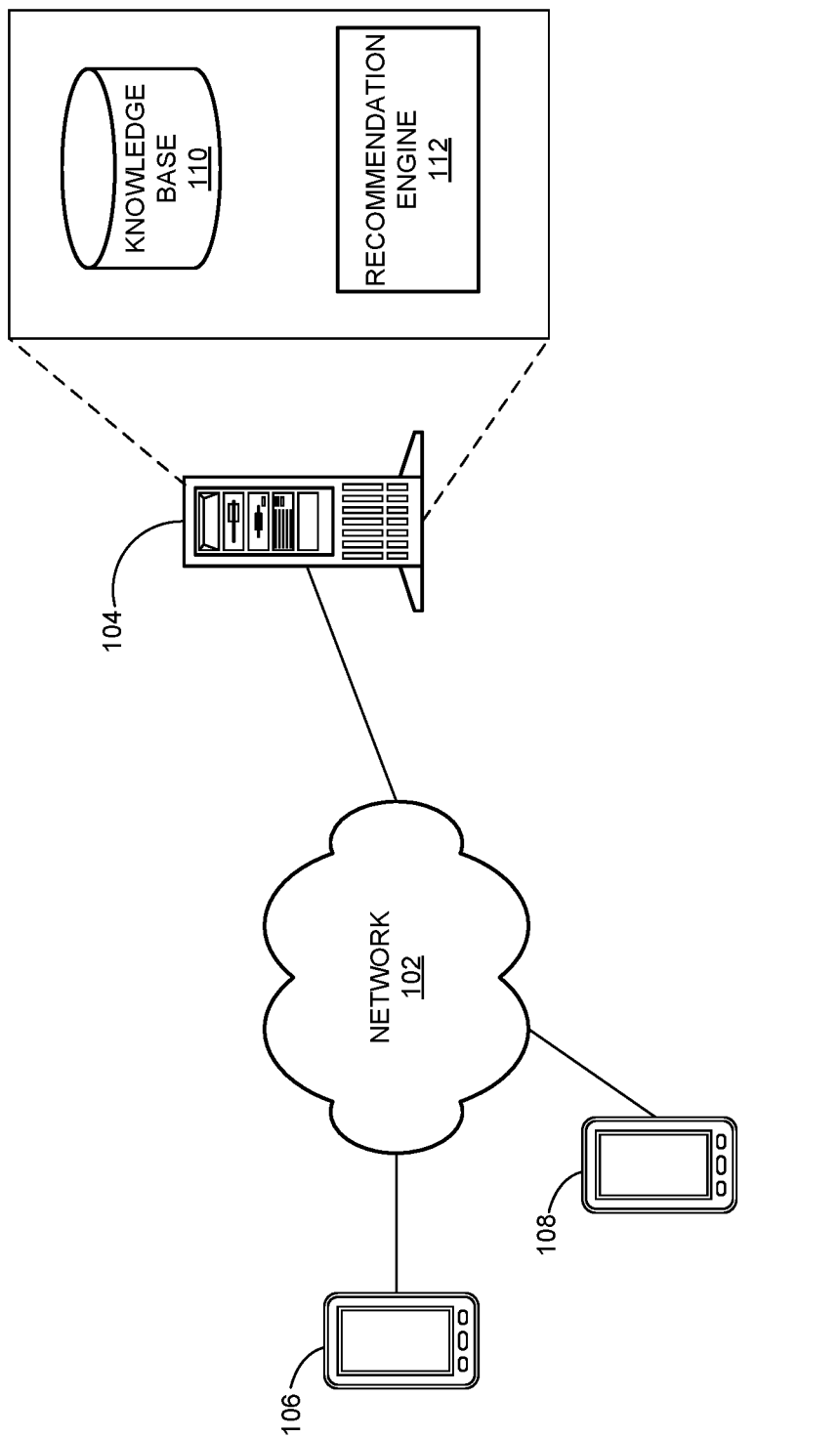
FIG. 1 presents a diagram illustrating an exemplary computing environment, according to one embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a content-recommendation system that can combine keyword-extraction with domain knowledge in order to provide accurate recommendation of content to a user. The content-recommendation system can train (e.g., by using an offline training mechanism) a domain-knowledge-based model. The trained domain-knowledge-based model can include hierarchical domain knowledge and domain-knowledge graphs associated with a particular domain. The hierarchical domain knowledge can specify a number of feature words that have clearly defined meanings in the domain, and the domain-knowledge graphs can specify a number of combination words that have clearly defined meanings in the domain. During operation, the system can combine the domain-knowledge-based model with keywords extracted from content pieces from a content library in order to create feature tags for the content pieces. Moreover, the system can also generate, for each individual user, a user attribute tag that indicates the user's preference or interest. By comparing the feature tags of the content pieces with the attribute tag of a particular user, the system can match a set of content pieces to the particular user's interest. The matched content pieces can then be presented to the user as recommendations.

Content-Recommendation System

Many current mobile applications use streams to present content to users in a fashion of extensive reading, where a large amount of information is presented. For example, social-networking applications can provide a news feed to allow the user to be informed of current events. Content provided via the feeds typically is not fine-tuned to match individual users' interests, and users often need to browse through many pieces in a feed to find content that matches their interest.

However, this feed-based content-presenting approach may not be suitable for mobile applications that need to present a smaller amount of content that can accurately match a particular theme or a user's interest. For example, when a user launches a mobile app, the user may wish to see relevant content on the main page without the need to flip through pages. The amount of content fitting into a single page can be limited, making it important for the system to identify content pieces that accurately match the user's interest. Mismatched content pieces can negatively affect the user's experience.

FIG. 1 presents a diagram illustrating an exemplary computing environment, according to one embodiment. In FIG. 1, computing environment 100 includes a network 102, an application server 104, and a number of mobile devices, including mobile devices 106 and 108.

Network 102 can include various types of wired or wireless networks. In some embodiments, network 102 can include the public switched telephone network (PSTN) and the Internet. Mobile devices 106 and 108 can include various computing devices, including but not limited to: smart-phones, tablet computers, laptop computers, personal digital assistants (PDAs), various wearable computing device (e.g., smartglasses and smartwatches), etc. In addition to mobile devices, the solutions provided herein can also be applied to other types of computing devices, such as desktop computers or computer servers.

Application server 104 can be a physical server that includes a standalone computer, a virtual server provided by a cluster of standalone computers, or a cloud server. Application server 104 can be coupled to a knowledge base 110 and recommendation engine 112. Recommend engine 112 can be configured to recommend content to application users. Knowledge base 110 can store the training samples for training a model used by recommendation engine 112 as well as to-be-recommended content. The recommended content pieces can be delivered to a mobile device (e.g., mobile device 106 or 108) associated with a user via network 102. The content pieces can be presented to the user on a display of the mobile device as recommendations.

Conventional content-recommendation approaches rely on simple keyword matching (e.g., matching a keyword in the content to a keyword in the description of a user's interest). If the meaning of the keyword is broad, the system can return a relatively large number of content pieces, many of which may not be useful to the user. In order to increase the accuracy of content recommendation, in some embodiments of the present application, the system uses domain knowledge to train a domain-knowledge-based model to identify keywords that have clear or definite meanings in a domain. Instead of extracting any keywords, the domain-knowledge-based model incorporates domain knowledge, particularly knowledge about the domain hierarchy, to extract feature words and feature combination words that have clearly defined meanings in a particular domain. Such feature words and feature combination words can reflect the true meaning of a content piece more accurately, thereby improving the quality of the content recommendation. For example, a simple keyword match for the word "automobile" may return a large number of content pieces, without distinguishing whether they are associated with "car maintenance" or "traffic violation." On the other hand, feature words in the domain hierarchy or combination words, such as "automobile-maintenance" or "car-accident," can provide more meaningful information about a content piece to facilitate the recommendation system to match the content piece to the user's interest.

In some embodiments, a machine-learning technique can be used to facilitate the content-recommendation process. For each domain (e.g., theme or topic), the system can train a domain-knowledge-based model that can model the hierarchical relationships among words meaningful in the domain and construct domain-knowledge graphs. The model training can be performed offline (e.g., before the operation of the content-recommendation system) using training samples (e.g., language corpora).

Figure 2:
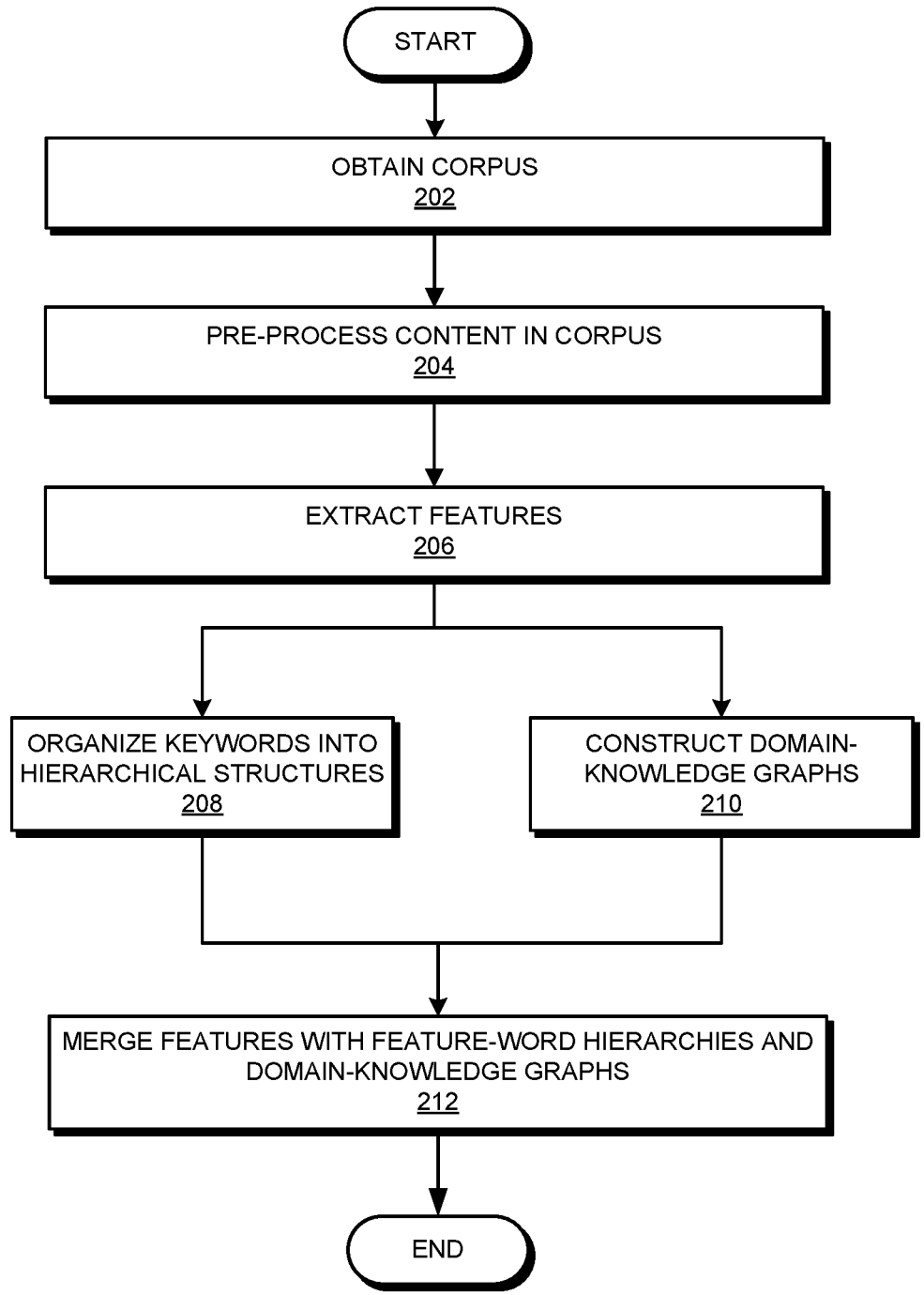
FIG. 2 presents a flowchart illustrating an exemplary offline model-training process, according to one embodiment.

FIG. 2 presents a flowchart illustrating an exemplary offline model-training process, according to one embodiment. During operation, the system obtains a large language corpus (operation 202) and pre-processes content in the corpus (operation 204). Standard natural language processing (NLP) techniques can be used, such as word segmentation, filtering out stop words, name-entity recognition (NER), etc. More specifically, the text in the corpus can be segmented into unigrams, bigrams, trigrams, etc.; filtering out the stop words can include removing nonsense functional words (e.g., this, that, of, etc.); and the NER may include recognizing an entity (e.g., a person's name, a place name, an institution's name, a proper noun etc.) having a special meaning in the text. Additional NLP techniques, such as structural analysis, which includes an analysis of the paragraph structure (e.g., determining a title and a body of text) and part-of-speech tagging or annotation (e.g., annotating words or phrases as nouns, adverbs, adjectives, etc.) can be used.

After pre-processing, the system can extract features (e.g., feature words or phrases) from the language corpus (operation 206). Various keyword- or keyphrase-extraction algorithms can be used, including but not limited to: a TextRank algorithm, a term frequency-inverse document frequency (TF-IDF) algorithm, etc.

Subsequently, the system can apply domain knowledge to organize extracted feature words or keywords associated with a particular domain or topic into a hierarchical structure (operation 208). For example, the hierarchical structure can be a tree structure, with the root of the tree being the domain name and leaves of the tree being words that have specific meanings in the domain. The tree branch to which a leaf is attached indicates the category and, if any, subcategory of the corresponding word. Note that these feature word hierarchies or trees are different from the syntax tree used by many linguistic models. Each leaf word can be a single word, a compound word, or a phrase that includes multiple words, as long as each leaf word has a single clearly defined meaning in the corresponding domain.

Figure 3:
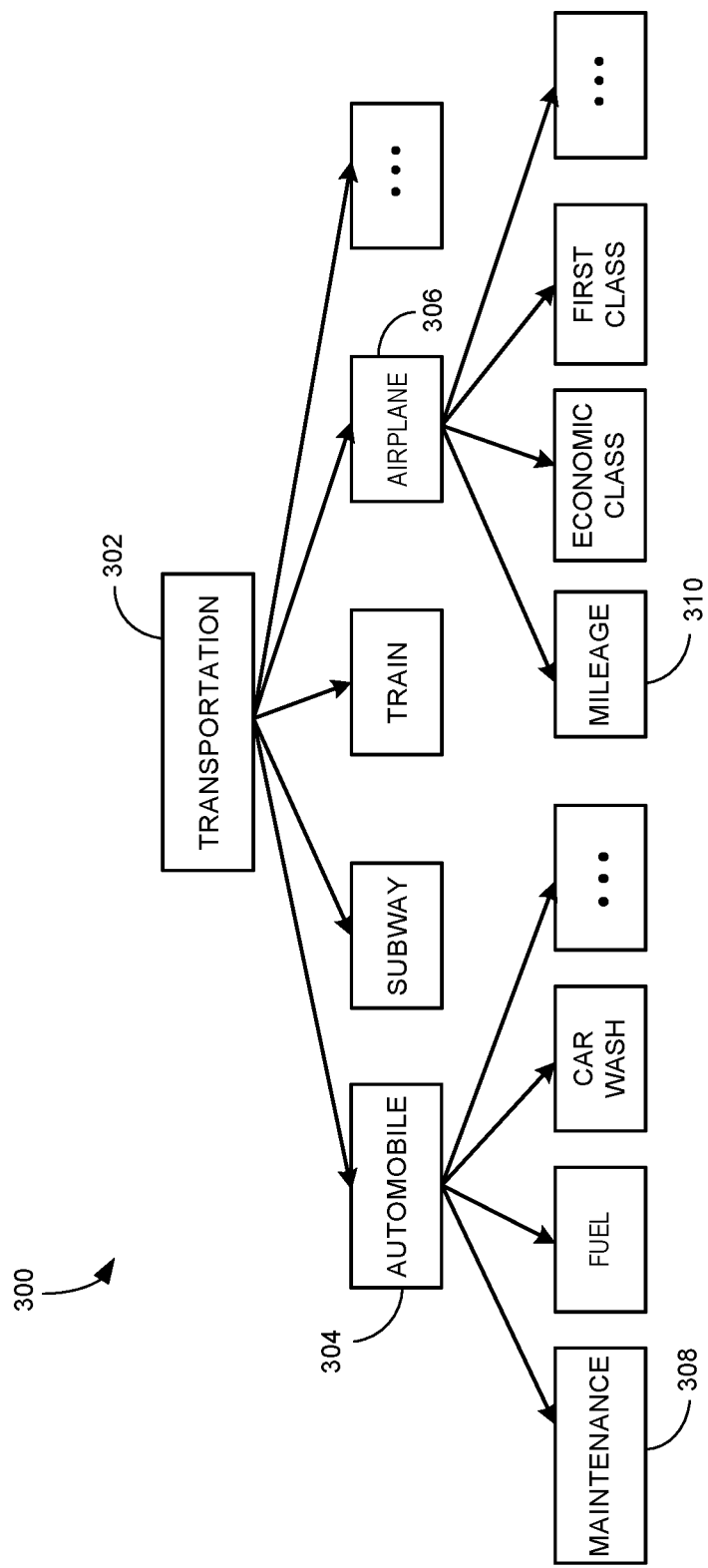
FIG. 3 shows an exemplary feature-word tree, according to one embodiment.

FIG. 3 shows an exemplary feature-word tree, according to one embodiment. In FIG. 3, tree 300 includes a root 302 and a number of nodes, such as nodes 304, 306, 308, and 310. Some nodes are leaf nodes (e.g., nodes 308 and 310), and some nodes are intermediate-level nodes (e.g., nodes 304 and 306). Root node 302 can specify a domain name, which can be a label assigned by the domain expert. In the example shown in FIG. 3, the domain name is "transportation."

The next level nodes can include keywords that can be used to label different categories in the domain. In this example, the various categories in the domain of transportation can include different means of transportation (e.g., automobile, subway, train, plane, etc.). Each category can include a number of feature words having specific meanings in the domain, indicated by the leaf nodes shown in FIG. 3. For example, there are a number of feature words belonging to the category of automobile, such as maintenance, fuel, car wash, etc. Similarly, the category of airplane can include certain feature words such as mileage, economic class, first class, etc. In the example shown in FIG. 3, tree 300 has three levels. It is possible that the feature-word tree can have fewer or more levels. For example, each category may have subcategories, and subcategories can further be divided.

The hierarchical domain knowledge can facilitate the identification of individual words that have strong and clear meanings in a particular domain, thus making these words valuable in expressing the true meaning of content pieces. However, in a particular domain, many combination words are used to express meanings that often cannot be expressed using a single word or phrase. A typical combination word can include at least two parts, with one part being an entity name and the other part being its attribute.

Returning to FIG. 2, in addition to organizing feature words associated with a domain into hierarchical structures, the training process can also include constructing domain-knowledge graphs that map the relationships between entities and their attributes (operation 210). Like those feature words in the feature-word tree shown in FIG. 3, the combination words created based on the domain-knowledge graphs have clearly defined meanings in specific domains and can accurately reflect the true meaning of content pieces.

Various approaches can be used to construct the domain-knowledge graphs. For example, the system can first mine (e.g., using a text-mining technology) the language corpus (e.g., a corpus for a particular domain) for entities (e.g., a proper noun) using the NER technique. The system can later use additional NLP-based techniques (e.g., template extraction, a word-correlation-based technique, a mutual-information-entropy-based technique, etc.) to determine additional word(s) that is associated with the entities. Template extraction can involve defining a template (e.g., "the rolling out of XXX of driver licenses) and extracting the associated word (e.g., "a new regulation") from the corpus. The word-correlation-based technique can involve using a sliding window having a predetermined length (e.g., three or five words) to extract words that concurrently appear with the entity word in the sliding window. The system can then identify words that have an occurrence frequency equal to or greater than a predetermined threshold (e.g., ten times or more) as words associated with the entity or entity word. The mutual-information-entropy-based technique can include determining similarities between words included in the corpus and the entity word, and words with a similarity level equal to or greater than a predetermined threshold (e.g., 0.6) can be identified as words associated with the entity or entity word.

Figure 4:
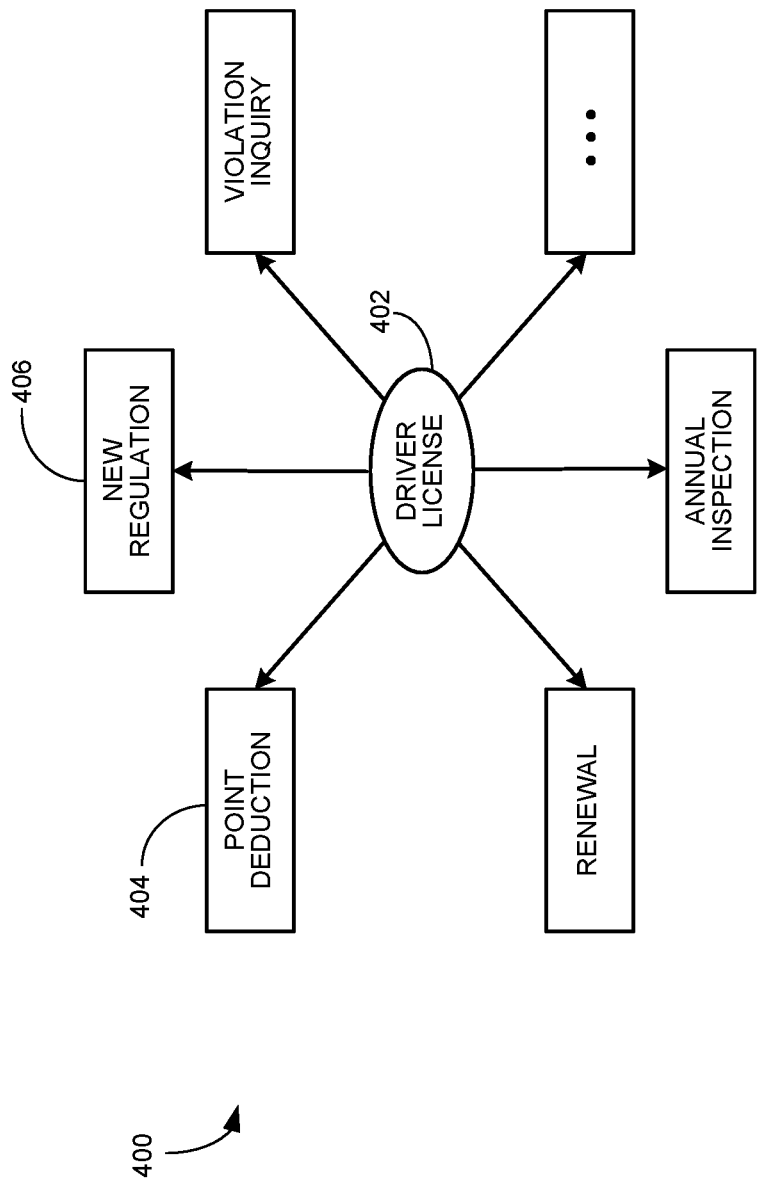
FIG. 4 illustrates an exemplary domain-knowledge graph, according to one embodiment.

FIG. 4 illustrates an exemplary domain-knowledge graph, according to one embodiment. A domain-knowledge graph 400 can include an entity node 402 and a number of attribute nodes (e.g., nodes 404 and 406) attached to entity node 402. In this example, entity node 402 can identify an entity name "driver license," and the attribute nodes can each include a word or phrase that describes an attribute of the entity "driver license," such as "point deduction," "renewal," "new regulation," etc. Domain-knowledge graph 400 can specify a number of combination words, including "driver license-renewal," "driver license-new regulation," etc., with each combination word combining the entity word with one of its attribute. The meaning of each combination word is clearly defined in the domain, thus allowing the combination word to closely express the meaning of content pieces.

Returning to FIG. 2, subsequent to constructing the feature-word trees and the domain-knowledge graphs, the system can merge the features extracted from the corpus with the feature-word trees and domain-knowledge graphs to generate a domain-knowledge-based model (operation 212). For example, the system can associate extracted feature words WITH feature-word trees and domain-knowledge graphs, and such associations can then be used to generate feature labels or tags for content pieces. Compared with conventional techniques, the feature tags or labels generated using the domain knowledge, including the domain-knowledge hierarchies and the domain-knowledge graphs, can describe the meaning of content pieces more precisely, thus enhancing the accuracy of content recommendation.

Once the domain-knowledge-based model is obtained, the system can apply this model during an online process. More specifically, the system can extract domain-knowledge-based features from online content (e.g., a webpage browsed by the user, content pieces currently displayed in the application page, content pieces in a content library, etc.) using the domain-knowledge-based model. The extracted domain-knowledge-based features can be used to generate a domain-knowledge-based content label or tag, which can then be used to match users' labels or tags. The users' label can include similar domain-knowledge-based feature words. If the similarity level between a content label and a user label is above a certain threshold or is ranked high, the content piece can be recommended to the user.

Figure 5:
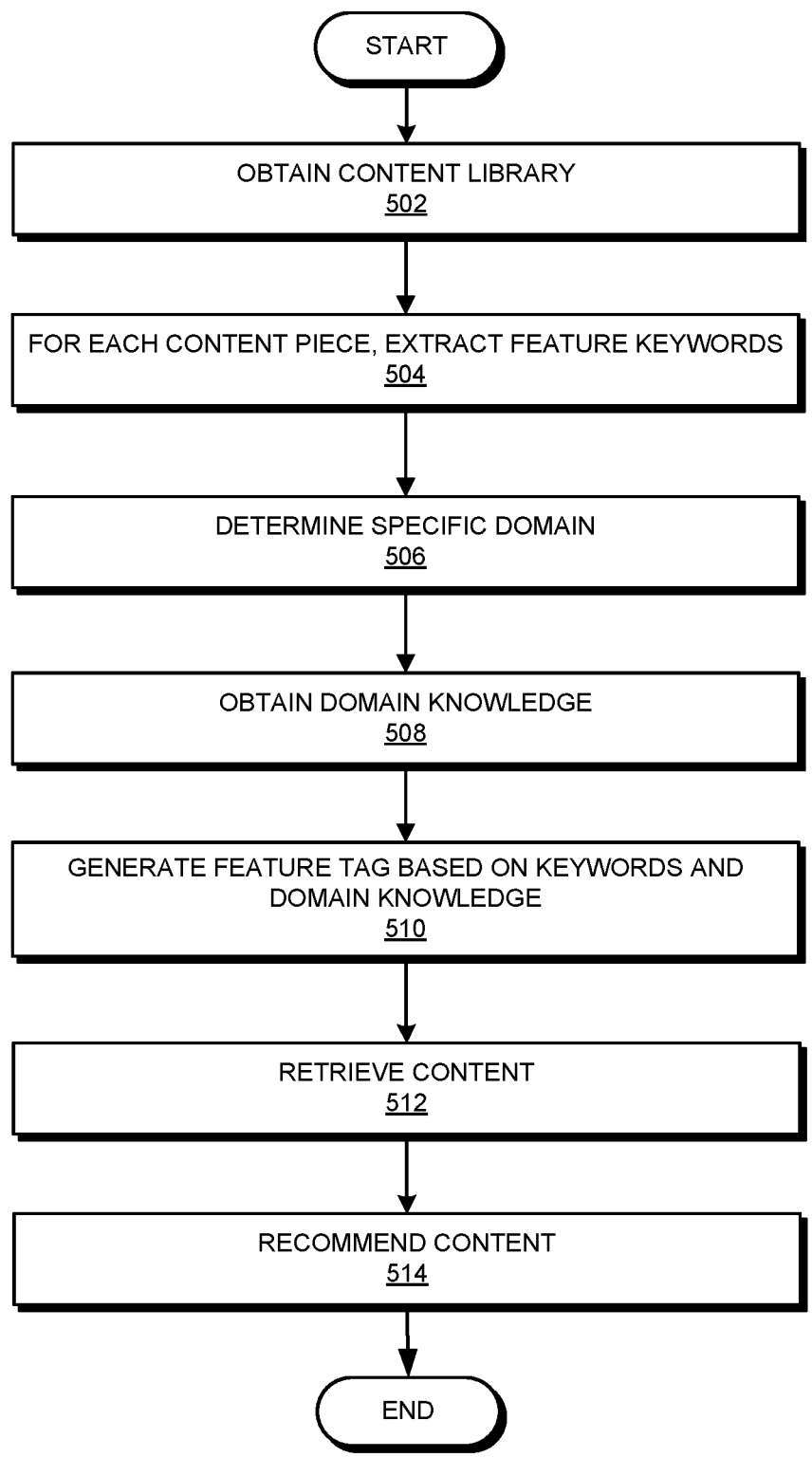
FIG. 5 presents a flowchart illustrating an exemplary content-recommendation process, according to one embodiment.

FIG. 5 presents a flowchart illustrating an exemplary content-recommendation process, according to one embodiment. During operation, the system obtains a content library (operation 502). The content library can include both textual as well as non-textual information (e.g., image files, audio files, video files, etc.). In some embodiments, the content library can be dynamic with new content being added and old content being deleted. For example, certain content pieces may be assigned an expiration time and will be deleted after expiration. The expiration time or the period when the content piece remains valid can be determined based on a service attribute (e.g., a timeliness requirement) of a service corresponding to the content. For example, a service or application providing news may set the expiration time of the news pieces as one day, whereas other types of service may have different expiration times for their content. For example, a service providing common scientific knowledge to users may set the expiration time for their content as one month or longer.

The system can then extract keywords from content pieces in the content library (operation 504). Note that, if a content piece contains textual information (e.g., the content piece includes an article), the keywords can be directly extracted from the textual information. However, for audio or video files, extracting the keywords can include converting at least portions of the audio or video files into textual information and then extracting keywords from the converted textual information. Alternatively, the keywords can be extracted from textual information (e.g., the metadata) associated with the audio or video files. For example, a video or audio clip may include a text-based introduction or summary, and the system can extract keywords from the introduction or summary text.

In some embodiments, prior to extracting the feature words, the system can pre-process the content in the content library using a number of NLP techniques, including but not limited to: structural analysis, word segmentation, stop word removal, part-of-speech annotation, NER, etc. Performing the structural analysis can include analyzing the paragraph structure of a text (e.g., determining a title, a body of text, etc.). The word segmentation may include segmenting the text into unigrams, bigrams, trigrams, etc. The stop word removal may involve removing nonsense functional words, for example, based on a predetermined list of stop words. The part-of-speech annotation can involve annotating a part of speech (e.g., a word or a phrase) based on its function in a sentence, such as a noun, an adverb, an adjective, etc. The NER process allows the system to recognize an entity (e.g., a person's name, a place name, an institution's name, a proper noun, etc.) in the text.

A number of keyword- or keyphrase-extraction algorithms can be used to extract keywords/keyphrases from the pre-processed content, including but not limited to a TextRank algorithm and a TF-IDF algorithm. The pre-processed content can include a plurality of words/phrases, positions (e.g., title or body of the text) of these words/phrases, annotated parts of speech, etc. The keyword- or keyphrase-extraction algorithm can assign weights and recognize keywords or keyphrases from the pre-processed content.

For a particular content piece, the system can determine a specific domain corresponding to the content piece (operation 506). In one embodiment, a content piece (e.g., a text file, an audio or video clip, etc.) can include a domain tag, which indicates a domain associated with the content piece. Correspondingly, the specific domain corresponding to the content piece can be determined based on the domain tag. The domain tag may be defined by the creator of the content piece to facilitate convenient searching for the content piece. For example, a domain tag associated with a content piece can be 'transportation,' indicating that this content piece is associated with the domain of transportation.

In some examples, a content piece may not include a domain tag, and the system can then determine the specific domain associated with the content piece based on the keywords/keyphrases extracted from the content piece. More specifically, the extracted keywords/keyphrases may include the name of a known domain or be closely related to the name of a specific known domain. Accordingly, the system can determine that the content piece is associated with the specific known domain.

Subsequent to determining the specific domain associated with a content piece, the system can obtain domain knowledge corresponding to the specific domain (operation 508). The domain knowledge can be stored in the application server or in a database accessible by the application server. In some embodiments, the domain knowledge can include hierarchical domain knowledge (e.g., feature-word trees) and domain-knowledge graphs. For example, the hierarchical domain knowledge may include a domain name, a number of categories corresponding to the domain name, and a number of keywords corresponding to each category. In some embodiments, the hierarchical domain knowledge can include a feature-word tree similar to the example shown in FIG. 3. A domain-knowledge graph can include an entity node representing an entity and a number of nodes connected to the entity nodes representing words associated with the entity. The combination of the entity node and an associated node can result in a combination word that can be used to express a specific meaning in the domain. The entity node can be considered to be in the first layer of the domain-knowledge graph, whereas the associated nodes can be considered to be in the second layer. In some embodiments, the domain-knowledge graph can include two layers, similar to the example shown in FIG. 4. It is also possible for the domain-knowledge graph to have additional layers.

The domain name and the categories and, in some examples, additional subcategories included in the hierarchical domain knowledge associated with a domain may be defined according to a general known knowledge system (e.g., a knowledge system that includes the division of domains and subjects). In some embodiments, the hierarchical domain knowledge, including the feature words (e.g., leaf words in the feature-word trees) of the domain, can be obtained by training a domain-knowledge-based model using a large language corpus using a process similar to the one shown in FIG. 2. For example, once the domain-knowledge-based model is trained (e.g., using a machine-learning technique, such as supervised learning or unsupervised learning), the system can apply the domain-knowledge-based model to content pieces within the content library.

Similarly, the domain-knowledge graph (including the entities and their attribute nodes can be obtained by training a domain-knowledge-based model using a large language corpus. More specifically, the system can recognize (e.g., using NER) an entity word (e.g., a proper noun) within a domain. In one example, a proper noun "driver license" within domain "transportation" may be recognized. Subsequently, the system can use various NLP techniques (e.g., template extraction, a word-correlation-based technique, a mutual-information-entropy-based technique, etc.) to determine additional word(s) associated with the entities. Template extraction can involve defining a template (e.g., "the rolling out of XXX of driver licenses) and extracting the associated word (e.g., "a new regulation") from the corpus. The word-correlation-based technique can involve using a sliding window having a predetermined length (e.g., three or five words) to extract words that concurrently appear with the entity word in the sliding window. The system can then identify words that have an occurrence frequency equal to or greater than a predetermined threshold (e.g., ten times or more) as words associated with the entity or entity word. The mutual-information-entropy-based technique can include determining similarities between words included in the corpus and the entity word, and words with a similarity level equal to or greater than a predetermined threshold (e.g., 0.6) can be identified as words associated with the entity or entity word.

In one example, the system can determine in operation 506 that the specific domain associated with a content piece is "transportation," and can then obtain corresponding hierarchical domain knowledge, similar to the feature-word tree shown in FIG. 3. In FIG. 3, the categories are parallel categories in the domain, with keywords in the domain being categorized into the multiple categories. There can also be different ways of categorizing a domain. For example, in addition to means of transportation, the domain of transportation may also be divided into public and private categories. Different ways to categorize a domain can also mean that different hierarchical structures (e.g., feature-word trees) can be created for a single domain.

Similarly, a single domain may include a plurality of entity words, and correspondingly, a plurality of domain-knowledge graphs can be generated for the domain. Each domain-knowledge graph can include, in its first layer, an entity word, and in its second layer, a plurality of attribute words associated with the entity. In one example, the system can determine in operation 506 that the specific domain associated with a content piece is "transportation," and can then obtain a plurality of domain-knowledge graphs corresponding to entities included in the domain of transportation. For example, an obtained domain-knowledge graph can be similar to the one shown in FIG. 4. In FIG. 4, the entity word is "driver license," and the attribute words associated with the entity word can include "point deduction," "new regulation," "violation inquiry," "renewal," "annual inspection," etc.

Subsequent to extracting the keywords and obtaining the domain knowledge (including both the hierarchical domain knowledge and the domain-knowledge graphs), the system can generate a feature tag for a content piece based on the extracted keywords and the obtained domain knowledge (operation 510). For example, one or more extracted keywords that match the leaf words in the feature-word tree according to the hierarchical domain knowledge can be chosen as the feature tag of the content piece. Alternatively, the system can rank the extracted keywords according to the obtained domain knowledge. Keywords having a ranking within a predetermined range can be chosen as the feature tag of the content piece.

In one embodiment, generating the feature tag of the content piece from the extracted keywords based on the hierarchical domain knowledge may include determining a specific category corresponding to the content piece and then determining, based on the hierarchical domain knowledge (e.g., a feature-word tree), a category name corresponding to the specific category and one or more feature words (e.g., the leaf words in the feature-word tree) corresponding to the category name. The system can then determine the feature tag of the content piece according to the one or more feature words corresponding to the category name.

In one example, a content piece may include a category tag that is generated by the creator of the content piece to facilitate content search. In such a scenario, the specific category corresponding to the content piece can simply be determined based on the category tag. For example, the category tag included in a content piece in the domain of transportation can specify "automobile," and accordingly the system can determine that the specific category corresponding to the content piece is category "automobile."

In another example, the specific category corresponding to the content piece may be determined based on extracted keywords. In one example, an extracted keyword can include a category name (e.g., "automobile"), and the system can then determine the specific category for the content piece based on category name included in the extracted feature words.

In one example, the determined specific category associated with the content piece is category "automobile," and the hierarchical domain knowledge can include a feature-word tree similar to the one shown in FIG. 2. Accordingly, the system can determine that the category name for the determined specific category is "automobile," and that the feature words corresponding to this category name (i.e., automobile) can include maintenance, fuel, car wash, etc.

In some embodiments, determining the feature tag of a content piece can include matching one or more keywords extracted from the content piece with the feature words (e.g., the leaf words in the feature-word tree) specified by the hierarchical domain knowledge. The keywords that match the feature words of the domain can be chosen as the feature tag. For example, the feature words for the automobile category in the transportation domain can include "maintenance," "fuel," "car wash," etc. On the other hand, keywords extracted from a content piece can include "maintenance" and "car wash." Accordingly, the system can add the words "maintenance" and "car wash" to the feature tag for this content piece.

In some embodiments, while extracting keywords from a content piece, the keyword- or keyphrase-extraction algorithm may also assign weights to the extracted keywords. In such a scenario, determining the feature tag of the content piece can include updating the weights of the plurality of extracted keywords based on the feature words specified by the hierarchical domain knowledge. For example, the weight of a keyword that matches or partially matches a feature word (e.g., a leaf word) can be increased. The feature tag of the content piece can then be determined based on the updated weights. Keywords with updated weights exceeding a predetermined threshold can be included in the feature tag. For example, when a keyword (for example "car wash")

completely matches a feature word specified by the hierarchical domain knowledge, the weight of this keyword can be increased by a larger predetermined amount (e.g., 0.1). On the other hand, when a keyword (for example "automatic wash") partially matches the feature word (i.e., car wash), the weight of the keyword may be increased by a smaller predetermined amount (e.g., 0.05); if a keyword does not match any of the feature words specified by the hierarchical domain knowledge, the weight of the keyword can remain unchanged. This way, the weights of all extracted keywords can be updated. With respect to a keyword whose weight is updated, the system can determine if the final weight of the keyword is greater than a predetermined threshold (e.g., 0.5), and if so, the system adds the keyword to the feature tag of the content piece.

In some embodiments, the system can also rank the extracted keywords (e.g., based on their weights). In such a scenario, determining the feature tag of the content piece can include updating the ranking of the keywords based on the hierarchical domain knowledge. Keywords with updated ranking within a predetermined ranking range can be included in the feature tag of the content piece. The predetermined ranking range may be predefined or modified in real time. For example, each extracted keyword may be associated with a weight value, and the weight value can be updated based on the hierarchical domain knowledge (e.g., based on the matching result between the keyword and the feature words). The weight values of the keywords can be updated according to the aforementioned weight-updating scheme. Subsequent to updating the weight values, the extracted keywords can be ranked according to their updated weight values, and keywords having ranks within the predetermined ranking range (e.g., one to ten) can be included the feature tag.

As discussed previously, in addition to the hierarchical domain knowledge, the system can also obtain domain-knowledge graphs and generate the feature tag based on the domain-knowledge graphs. More specifically, the system can determine a number of feature combination words included in the domain-knowledge graph, and then determine the feature tag of the content piece based on the extracted keywords and the determined feature combination words. In one example, the system can obtain a domain-knowledge graph similar to the one shown in FIG. 4, with the entity word being "driver license" and the attribute words associated with entity word including "point deduction," "new regulation," "violation inquiry," "renewal," "annual inspection," etc. Accordingly, the system can determine that the feature combination words for the domain can include: "driver license-point deduction," "driver license-new regulation," "driver license-violation inquiry," "driver license-renewal," "driver license-annual inspection," and so on.

In some embodiments, the system can determine a feature tag associated with the content piece based on the feature combination words specified by a domain-knowledge graph. More specifically, the system can match (at least partially) one or more extracted keywords to one or more of the feature combination words, and include the matched keywords in the feature tag. For example, the feature combination words determined based on the domain-knowledge graph can include: "driver license-point deduction," "driver license-new regulation," "driver license-violation inquiry," "driver license-renewal," "driver license-annual inspection," etc.; the keywords extracted from the content piece can include: "driver license," "point deduction," "new regulation," and "driver license annual inspection." Accordingly, the system can match the keywords to the feature combination words, and determine a feature tag that includes: "driver license-point deduction," "driver license-new regulation," and "driving license-annual inspection."

In another example, the system can assign weights to the extracted keywords. In such a scenario, while determining the feature tag of the piece, the system may update the weights of the extracted keywords according to the feature combination words specified by the domain-knowledge graph. The weight of a keyword that matches or partially matches a feature combination word can be increased. The greater the similarity between a keyword and a feature combination word, the greater the amount of weight increase.

In one example, the system may obtain the ranking information associated with the extracted keywords. For example, the extracted keywords can be ranked based on their assigned weights. In such a scenario, the system may need to update the ranking of the keywords based on the domain-knowledge graphs, and then determine the feature tag of the content piece based on the updated ranking. Keywords having updated ranking within a predetermined ranking range can be included in the feature tag of the content piece.

For example, each of the keywords may be associated with a weight value, which may be updated according to the matching between the keyword and the feature combination words (for example, whether the keyword matches or partially matches a feature combination word). If a keyword (e.g., driver license-point deduction) completely matches a feature combination word, the weight of the keyword can be increased by a predetermined larger amount (e.g., 0.1); if a keyword (e.g., driver license) partially matches a feature combination word, the weight of the keyword may be increased by a predetermined smaller amount (e.g., 0.05); and if a keyword does not match any of the feature combination words, the weight of the keyword can remain unchanged. Subsequent to updating the weights of the keywords, the system can re-rank the keywords according to the updated weights. Keywords with updated rankings within a predetermined ranking range (e.g., from one to five) can be included in the feature tag.

Subsequent to determining the feature tags for content pieces in the content library, the content-recommendation system can retrieve, from the content library, a plurality of content pieces associated with a user (operation 512). More specifically, the received content pieces can be determined based on their feature tags and an attribute tag associated with the user. Specifically, the content-recommendation system may generate an attribute tag for each user based on various historic information associated with the user, including but not limited to: application-usage history, content-browsing history, content-selection history, etc. In one embodiment, the attribute tag of a user may be determined based on the feature tags of one or more content pieces in the user's browsing history. If a content piece in the user's browsing history does not include a feature tag, the system can determine a feature tag for the content piece using a process similar to operations 504-510. If the user has a wide content-browsing range, to prevent the user attribute tag from being too long, the system can only add a smaller portion (e.g., the top-ranked feature words) of the feature tag of a previously viewed content piece to the user's attribute tag.

In one embodiment, the content-recommendation system retrieves content based on the comparison between feature tags of content pieces and the attribute tag of the user.

Content pieces with feature tags that have a certain association with or similarity to the user attribute tag can be retrieved. For example, if the feature tag of a content piece matches or partially matches the attribute tag of the user, the content piece can be retrieved. In some embodiments, a user's attribute tag can be dynamic. More specifically, in addition to the historical data associated with the user, determining the user's attribute tag can also take into consideration the current application-usage scenario. For example, if the user is browsing information in the user interface of an application (e.g., a financial application or a life-style application), the user's attribute tag can also be determined based on the topic or theme of the current user interface. If the main window within the current user interface provides stock quotes for a particular company, the name of the company can be included in the user's attribute tag to allow the system to retrieve content associated with the company for the user. Such information may also be included into a scenario tag, which is separated from the user's attribute tag. When recommending content piece, the content-recommendation system may also compare the feature tags of content pieces and the scenario tags of a current display scenario.

Subsequent to retrieving a number of content pieces from the content library, the content-recommendation system can perform further processing (e.g., screening and ranking) to recommend a predetermined number of content pieces to the user (operation 514). More specifically, the content-recommendation system may retrieve a relatively large number of content based on the matching between the feature tags of the content pieces and the user attribute tag. To enhance the user's reading experience, further content screening and filtering can be provided.

In some embodiments, the content-recommendation system can perform content screening based on one or more predetermined rules. For example, one content-screening rule can be based on ranking. More specifically, the retrieved content pieces can be ranked based on the similarity level between their feature tags and the user's attribute tag. A content piece with a feature tag having a higher similarity level with the user's attribute tag can be ranked higher than a content piece with a feature tag having a lower similarity level. Depending on the display requirements (e.g., the space constraints), the content-recommendation system can select a predetermined number of highest-ranked content pieces to recommend to the user. In some embodiments, these recommended content pieces can be displayed (e.g., on a side panel of a current application) to the user while the user is using the application. For example, when the user is reading a news story in a news application, additional news stories having features matching the user's attribute tag can be recommended and displayed to the user on a side panel of the news application.

In one embodiment, scores can be assigned to retrieved content pieces based on weights associated with their feature tags. Content pieces with feature tags of larger weights can have a higher score. In a further embodiment, if a content assembly includes multiple content pieces, with each content piece having its own feature tag, the total score of the content assembly can be the weighted sum of the scores of each content piece. Alternatively, each feature word in the feature tag that matches a feature word in the user's attribute tag can be assigned a score based on its weight, and the total score of the content piece can be the weighted sum of all matching feature words. The ranking of the content pieces can be determined based on their scores.

In some embodiments, subsequent to ranking the retrieved content pieces, the system recommends content pieces within a predetermined ranking range to the user. The predetermined ranking range can vary depending on the type of service provided by the application associated with the content. For example, if the application is designed to provide science and technology information to users, the content-recommendation system may recommend five highest-ranked content pieces to the user. On the other hand, if the application is designed to provide music to the user, the content-recommendation system may recommend ten highest-ranked music pieces to the user.

In addition to retrieving and recommending content pieces from a content library, in some embodiments, the content-recommendation system may also recommend content based on user similarities. More specifically, upon determining the attribute tag associated with a particular user (e.g., based on a particular user's historic data), the content-recommendation system can determine similarities between the particular user and a plurality of other users based on their attribute tags. A different user can be identified as a similar user to the particular user if the similarity level between the user attribute tags of the two users is above a predetermined threshold. Upon identifying the similar users, the content-recommendation system can use the browse histories of the similar users to recommend content to the particular user. If a similar user has read a certain content piece in the content library, the content-recommendation system can recommend the same content piece from the content library to the particular user.

So far we have assumed that a content piece corresponds to a specific domain. However, it is also possible for one content piece to correspond to multiple domains. In such a situation, once the system identifies the multiple domains associated with the content pieces (e.g., in operation 506), the system needs to obtain domain knowledge (including hierarchical domain knowledge and domain-knowledge graphs) for the identified multiple domains.

In one embodiment, once the hierarchical domain knowledge for an identified domain is obtained, the system can also identify a specific category within the domain associated with the content piece. Accordingly, a number of feature words corresponding to the identified category can be determined. The feature tag for the content piece can then be determined based on the feature words and keywords extracted from the content pieces.

Similarly, once a domain-knowledge graph for the identified domain is obtained, a number of feature combination words specified by the domain-knowledge graph can be determined, and the feature tag for the content piece can then be determined based on the feature combination words and keywords extracted from the content pieces.

Note that the hierarchical domain knowledge and the domain-knowledge graphs can provide information regarding different aspects of a domain. Feature words specified by the hierarchical domain knowledge (e.g., the feature-word tree) typically include single words or phrases, whereas the domain-knowledge graphs specify combinations of words or phrases, with each word or phrase in the combination having its own meaning. Moreover, the feature words specified by the hierarchical domain knowledge typically are strongly associated with the different categories in the domain. In other words, one can easily infer one or more categories to which a feature word belongs. For example, the feature words "automobile" or "car wash" clearly belong to the "automobile" not the "train" category in the example shown in FIG. 3. On the other hand, certain words, such as "new regulation," may be associated with multiple categories, and may have different meanings in the different categories. The model based on the hierarchical domain knowledge will not select such words as feature words. On the other hand, a model based on the domain-knowledge graphs can be used to identify combinations of words or phrases that have an explicit semantic meaning in the specific domain, although the meaning of each individual word or phrase may be less specific. While generating the domain-knowledge-based model, it is possible for the system to only apply one of the hierarchical domain knowledge and the knowledge-based graphs. On the other hand, it is also possible for the system to incorporate the hierarchical domain knowledge and the knowledge-based graphs to generate a combined model and use such a combined model in content recommendation.

Figure 6:
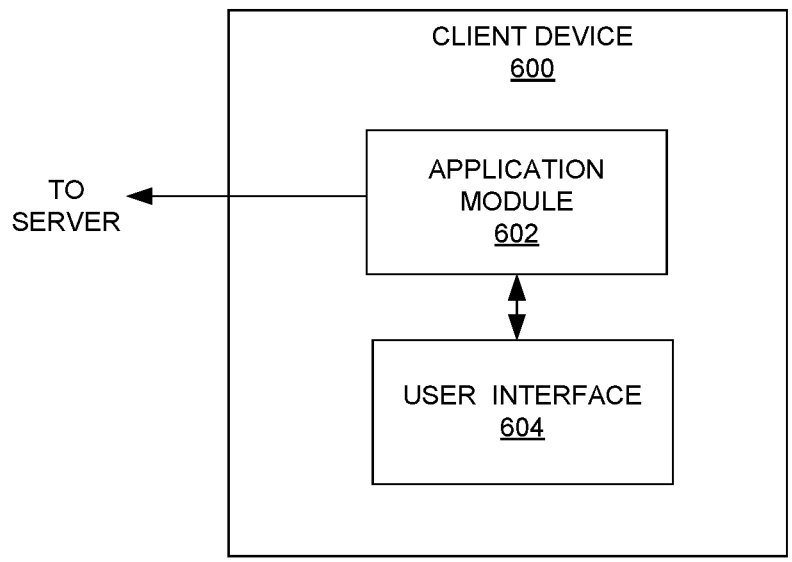
FIG. 6 presents a diagram illustrating the exemplary architecture of a client device, according to one embodiment.

FIG. 6 presents a diagram illustrating the exemplary architecture of a client device, according to one embodiment. Client device 600 can include an application module 602 and a user interface 604. Applicant module 602 provides particular services for the user (such as news services, music services, weather services, etc.) by interacting with a remote application server. User interface 604 facilitates the interaction between the user and the application. More specifically, user interface 604 can display a list of content pieces recommended to the user by a content-recommendation system associated with the application and can receive a selection from the user for a content piece. Note that the content-recommendation system can be application-specific or it can serve a broad range of applications.

Figure 7:
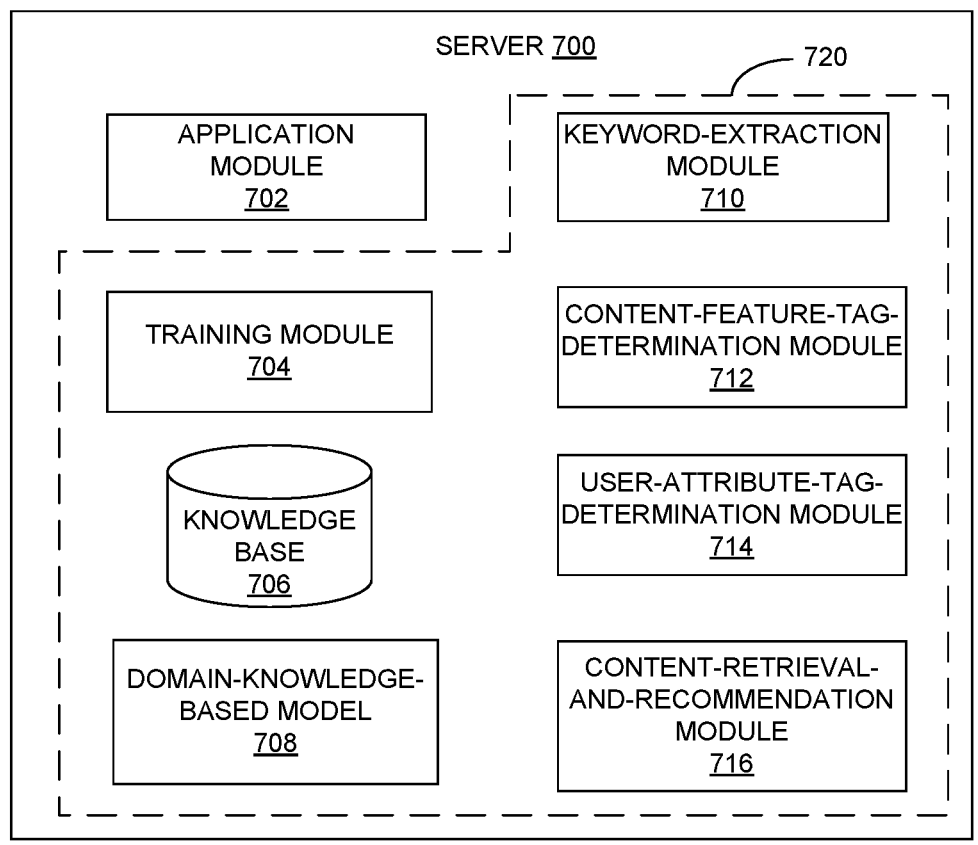
FIG. 7 presents a diagram illustrating the exemplary architecture of a server, according to one embodiment.

FIG. 7 presents a diagram illustrating the exemplary architecture of a server, according to one embodiment. In FIG. 7, server 700 can include an application module 702, a training module 704, a knowledge base 706, a domain-knowledge-based model 708, a keyword-extraction module 710, a content-feature-tag-determination module 712, a user-attribute-tag-determination module 714, and a content-retrieval-and-recommendation module 716.

Application module 702 interacts with the application module on the client side to provide a certain kind of service to the user. The other modules (e.g., modules 704-716) together form a recommendation engine 720, which can be responsible for recommending content to users of the application provided by application module 702. In some embodiments, recommendation engine 720 can be embedded in application module 702 to provide application-specific recommendations. Alternatively, recommendation engine 720 can be a standalone module capable of providing recommendations to multiple application modules. In addition to being located on the same server with application module 702 as shown in FIG. 7, recommendation engine 720 can also reside on a separate server or server cluster that is coupled to server 700.

Training module 704 trains domain-knowledge-based model 708 using one or more language corpora stored in knowledge base 706. Various training methods, including both supervised training and unsupervised training methods can be used to train domain-knowledge-based model 708, which can include models built upon hierarchical domain knowledge (e.g., feature-word trees) and domain-knowledge graphs.

In addition to the language corpora used for training domain-knowledge-based model 708, knowledge base 706 can also include a content library that stores content pieces to be recommended to the users. It is also possible for the language corpora and the content library to be stored in different databases.

Keyword-extraction module 710 can extract keywords from content pieces stored in knowledge base 706. More specifically, keyword-extraction module 710 can use various NLP techniques to pre-process the content and extract keywords or keyphrases from the pre-processed content.

Content-feature-tag-determination module 712 can determine one or more feature tags for a content piece by applying domain-knowledge-based model 708 to the extracted keywords or keyphrases. In some embodiments, content-feature-tag-determination module 712 can determine a special domain associated with the content piece and can obtain hierarchical domain knowledge and/or domain-knowledge graphs for the domain based on domain-knowledge-based model 708. More specifically, domain-knowledge-based model 708 can define a number of feature words or feature combination words for the domain, and content-feature-tag-determination module 712 determines a feature tag for the content piece by comparing the keywords extracted by keyword-extraction module 710 and the feature words or feature combination words. In one embodiment, a content piece may include a domain tag and content-feature-tag-determination module 712 can determine a specific domain associated with the content piece based on the domain tag. In a further embodiment, a content piece may include a domain tag and a category tag, thus allowing content-feature-tag-determination module 712 to determine a category and then identify a number of feature words within the category. In some embodiments, determining the feature tag for a content piece can also involve ranking the extracted keywords based on their matching results with the feature words or feature combination words.

User-attribute-tag-determination module 714 can determine the attribute tags associated with users based on a number of factors. In some embodiments, the attribute tag associated with a user can be determined based on historical data, such as content pieces that have been read by the user in the past. More specifically, the attribute tag of a user can include the feature tags of those historical content pieces. In addition, the attribute tag of a user can also be dynamic and associated with the current environment of the user interface, such as the current theme or topic of content presented to the user on the user interface. Information associated with the current environment of the user interface can be provided by application module 702.

Content-retrieval-and-recommendation module 716 can retrieve content pieces from knowledge base 706 based on the comparison between content feature tags and the user attribute tag. Content-retrieval-and-recommendation module 716 can further rank the retrieved content pieces and recommend the top-ranked content pieces to the user. The number of content pieces to be recommended to users can be determined based on the specific application (e.g., an application may recommend the top five content pieces, while another application may recommend the top ten pieces). Other considerations can also include the space constraints or the design requirements of the user interface. Content-retrieval-and-recommendation module 716 can send the recommended list to application module 702, which can then communicate such information to the client device.

Computer and Communication System

Figure 8:
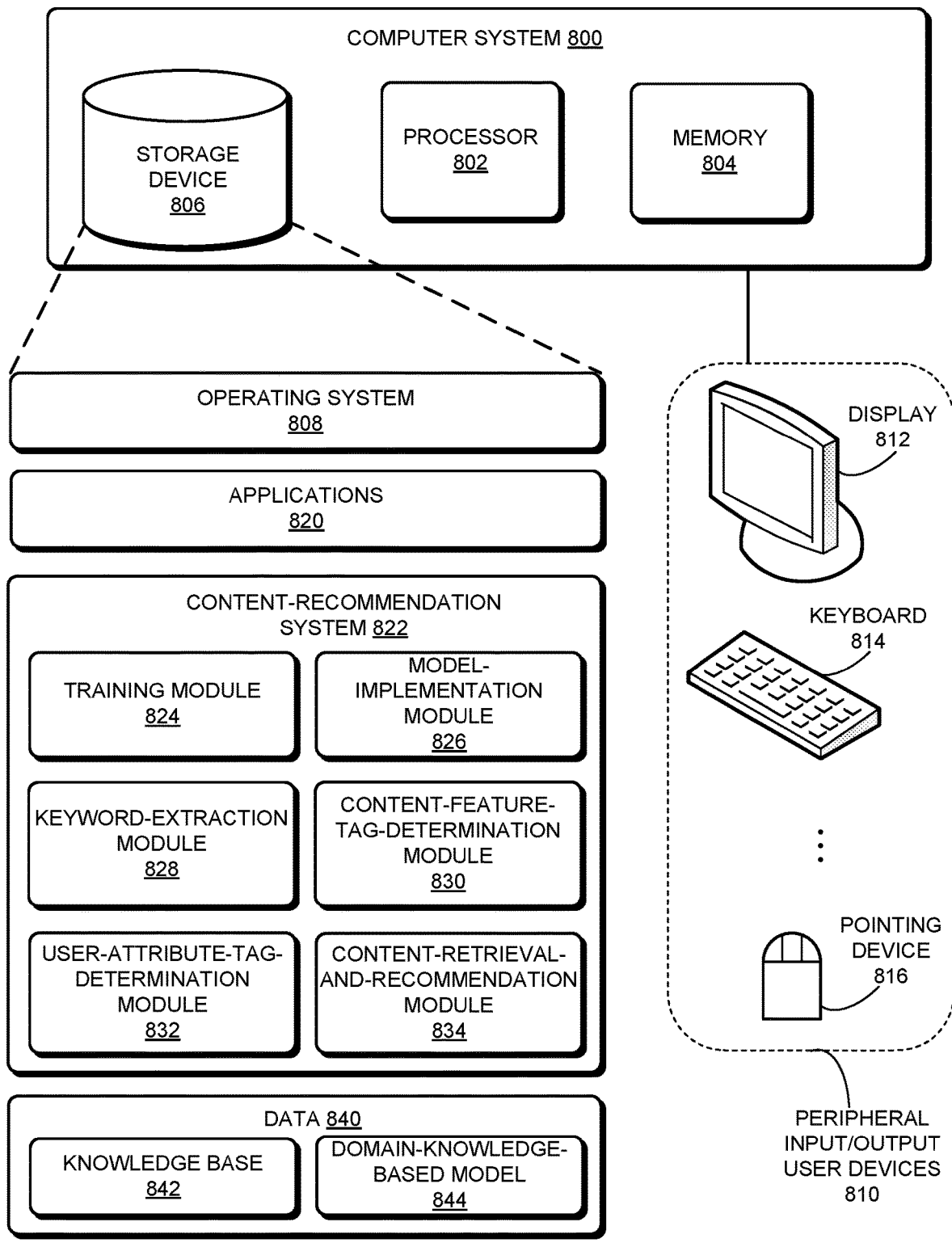
FIG. 8 illustrates an exemplary computer and communication system for content recommendation, according to one embodiment.

FIG. 8 illustrates an exemplary computer and communication system for content recommendation, according to one embodiment. In FIG. 8, computer system 800 can include a processor 802, a memory 804, and a storage device 806. Furthermore, computer system 800 can be coupled to peripheral input/output (I/O) user devices 810, e.g., a display device 812, a keyboard 814, and a pointing device 816.

Storage device 806 can store an operating system 808, one or more applications 820, a content-recommendation system 822, and data 840.

Applications 820 can include instructions, which can be loaded from storage device 806 into memory 804 and executed by processor 802. As a result, computer system 800 can perform specific functions provided by applications 820.

Content-recommendation system 822 can include instructions, which when executed by computer system 800, can cause computer system 800 or processor 802 to perform methods and/or processes described in this disclosure. Specifically, content-recommendation system 822 can include instructions for training domain-knowledge-based models (training module 824), instructions for implementing the domain-knowledge-based models (model-implementation module 826), instructions for extracting keywords from content pieces (keyword-extraction module 828), instructions for determining feature tags for content pieces (content-feature-tag-determination module 830), instructions for determining attribute tags for users (user-attribute-tag-determination module 832), and instructions for retrieving content pieces and recommending content pieces to users (content-retrieval-and-recommendation module 834).

Data 840 can include a knowledge base 842 and domain-knowledge-based model 844. Knowledge base 842 can include one or more language corpora that can be used to train the domain-knowledge-based model. Knowledge base 842 can further include a content library that stores content pieces to be recommended to users.

In some embodiments, applications 820 and the various modules in content-recommendation system 822, such as modules 824, 826, 828, 830, 832, and 834 can be partially or entirely implemented in hardware and can be part of processor 802. Further, in some embodiments, the system may not include a separate processor and memory. Instead, in addition to performing their specific tasks, modules 820, 824, 826, 828, 830, 832, and 834, either separately or in concert, may be part of general- or special-purpose computation engines.

In general, the disclosed embodiments provide a solution to the technical problems of efficiently recommending content to a user when the user is interacting with an application running on a computing device. More specifically, the disclosed embodiments can provide a content-recommendation system that includes a content library storing content to-be-recommended to users. The content-recommendation system can train domain-knowledge-based models (e.g., using various machine-learning techniques) to obtain domain knowledge for various domains. The domain knowledge of a particular domain can include hierarchical domain knowledge, domain-knowledge graphs, or both. The hierarchical domain knowledge can specify a number of categories and a number of feature words for each category, and the domain-knowledge graphs can specify a number of feature combination words. By combining the domain-knowledge-based models and keywords extracted from content pieces using standard NLP techniques, the content-recommendation system can generate domain-knowledge-based feature tags for the content pieces. Compared with conventional content-recommendation approaches where content pieces are retrieved simply based on keywords, this domain-knowledge-based approach can recommend content in a more precise manner, because the content feature tags are generated based on domain knowledge and can represent the meaning of the content pieces more accurately. Moreover, when matching content pieces to users, the content-recommendation system takes into consideration both the browsing history of the user as well as the current display environment (e.g., topic or theme of the current user interface, etc.), thus enhancing the user experience.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

What is claimed is:

1. A computer-executable method, comprising:
   selecting a content piece from a content library;
   extracting, by a computer using a natural language processing (NLP) technique, one or more keywords from the content piece;
   determining a domain associated with the content piece based on the extracted one or more keywords;
   obtaining hierarchical domain knowledge of the determined domain, wherein the obtained hierarchical domain knowledge is based on a tree structure comprising a root node corresponding to a domain name, a number of leaf nodes corresponding to feature words each having a respective defined meaning within the determined domain, and one or more branch nodes corresponding to one or more categories within the determined domain;
   obtaining one or more domain-knowledge graphs, a domain-knowledge graph of the one or more domain-knowledge graphs including an entity name and a number of attribute words associated with the entity name, the entity name and an attribute word indicating a feature combination word that is specific to the domain;
   generating a feature tag for the content piece based on the extracted one or more keywords and the obtained hierarchical domain knowledge;
   generating an attribute tag for a user based on historical data associated with the user; and
   recommending one or more content pieces from the content library to the user based on feature tags associated with the one or more content pieces and the attribute tag for the user,
   wherein the generating the feature tag includes:

comparing the extracted one or more keywords with one or more feature combination words defined by the one or more domain-knowledge graphs;

identifying an extracted keyword that matches a feature combination word of the one or more feature combination words; and adding the identified extracted keyword to the feature tag.

2. The method of claim 1, wherein the hierarchical domain knowledge specifies at least: the domain name, a number of categories within the domain, and a number of feature words within each category.

3. The method of claim 2, wherein generating the feature tag comprises:

determining a category associated with the content piece;

identifying a number of feature words associated with the determined category; and comparing the extracted one or more keywords with the identified feature words associated with the determined category.

4. The method of claim 3, wherein generating the feature tag comprises:

identifying an extracted keyword that matches one of the identified feature words associated with the determined category; and adding the identified extracted keyword to the feature tag.

5. The method of claim 3, further comprising:

ranking the extracted one or more keywords based on a result of the comparison between the extracted one or more keywords and the identified feature words associated with the determined category; and adding a number of extracted keywords having rankings within a predetermined ranking range in the feature tag.

6. The method of claim 5, wherein the extracted one or more keywords are associated with corresponding weight values, and wherein ranking the extracted one or more keywords comprises updating the weight values based on the result of the comparison and ranking the extracted one or more keywords based on the updated weight values.

7. The method of claim 1, wherein generating the attribute tag for the user comprises:

identifying a second content piece that has been read by the user;

obtaining a second feature tag for the second content piece; and adding at least a portion of the second feature tag to the attribute tag for the user.

8. The method of claim 1, wherein obtaining the hierarchical domain knowledge comprises applying a domain-knowledge-based model that has been previously trained using a machine-learning technique.

9. A computer system, comprising:

a processor; and a storage device coupled to the processor and storing instructions which when executed by the processor cause the processor to perform acts, the acts comprising:

selecting a content piece from a content library;

extracting, by a computer using a natural language processing (NLP) technique, one or more keywords from the content piece;

determining a domain associated with the content piece based on the extracted one or more keywords;

obtaining hierarchical domain knowledge of the determined domain, wherein the obtained hierarchical domain knowledge is based on a tree structure comprising a root node corresponding to a domain name, a number of leaf nodes corresponding to feature words each having a defined meaning within the determined domain, and one or more branch nodes corresponding to one or more categories within the determined domain;

obtaining one or more domain-knowledge graphs, a domain-knowledge graph of the one or more domain-knowledge graphs including an entity name and a number of attribute words associated with the entity name, the entity name and an attribute word indicating a feature combination word that is specific to the domain;

generating a feature tag for the content piece based on the extracted one or more keywords and the obtained hierarchical domain knowledge;

generating an attribute tag for a user based on historical data associated with the user; and recommending one or more content pieces from the content library to the user based on feature tags associated with the one or more content pieces and the attribute tag for the user, wherein the generating the feature tag includes:

comparing the extracted one or more keywords with one or more feature combination words defined by the one or more domain-knowledge graphs;

identifying an extracted keyword that matches a feature combination word of the one or more feature combination words; and adding the identified extracted keyword to the feature tag.

10. The computer system of claim 9, wherein the hierarchical domain knowledge specifies at least: the domain name, a number of categories within the domain, and a number of feature words within each category.

11. The computer system of claim 10, wherein generating the feature tag comprises:

determining a category associated with the content piece;

identifying a number of feature words associated with the determined category; and comparing the extracted one or more keywords with the identified feature words associated with the determined category.

12. The computer system of claim 11, wherein generating the feature tag comprises:

identifying an extracted keyword that matches one of the identified feature words associated with the determined category; and adding the identified extracted keyword to the feature tag.

13. The computer system of claim 11, wherein the acts further comprise:

ranking the extracted one or more keywords based on a result of the comparison between the one or more extracted keywords and the identified feature words associated with the determined category; and adding a number of extracted keywords having rankings within a predetermined ranking range in the feature tag.

14. The computer system of claim 13, wherein the extracted one or more keywords are associated with corresponding weight values, and wherein ranking the extracted one or more keywords comprises updating the weight values based on the result of the comparison and ranking the extracted one or more keywords based on the updated weight values.

15. The computer system of claim 9, wherein generating the attribute tag for the user comprises:

identifying a second content piece that has been read by the user;

obtaining a second feature tag for the second content piece; and adding at least a portion of the second feature tag to the attribute tag for the user.

16. The computer system of claim 9, wherein obtaining the hierarchical domain knowledge comprises applying a domain-knowledge-based model that has been previously trained using a machine-learning technique.

17. A non-transitory storage medium having computer executable instructions stored thereon, the computer executable instructions, when executed by a processor, enabling the processor to implement acts comprising:

selecting a content piece from a content library;

extracting, by a computer using a natural language processing (NLP) technique, one or more keywords from the content piece;

determining a domain associated with the content piece based on the extracted one or more keywords;

obtaining hierarchical domain knowledge of the determined domain, wherein the obtained hierarchical domain knowledge is based on a tree structure comprising a root node corresponding to a domain name, a number of leaf nodes corresponding to feature words each having a respective defined meaning within the determined domain, and one or more branch nodes corresponding to one or more categories within the determined domain;

obtaining one or more domain-knowledge graphs, a domain-knowledge graph of the one or more domain-knowledge graphs including an entity name and a number of attribute words associated with the entity name, the entity name and an attribute word indicating a feature combination word that is specific to the domain;

generating a feature tag for the content piece based on the extracted one or more keywords and the obtained hierarchical domain knowledge;

generating an attribute tag for a user based on historical data associated with the user; and recommending one or more content pieces from the content library to the user based on feature tags associated with the one or more content pieces and the attribute tag for the user, wherein the generating the feature tag includes:

comparing the extracted one or more keywords with one or more feature combination words defined by the one or more domain-knowledge graphs;

identifying an extracted keyword that matches a feature combination word of the one or more feature combination words; and adding the identified extracted keyword to the feature tag.

18. The non-transitory storage medium of claim 17, wherein the hierarchical domain knowledge specifies at least: the domain name, a number of categories within the domain, and a number of feature words within each category.

19. The non-transitory storage medium of claim 18, wherein generating the feature tag comprises:

determining a category associated with the content piece;

identifying a number of feature words associated with the determined category; and comparing the extracted one or more keywords with the identified feature words associated with the determined category.

20. The non-transitory storage medium of claim 19, wherein generating the feature tag comprises:

identifying an extracted keyword that matches one of the identified feature words associated with the determined category; and adding the identified extracted keyword to the feature tag.

* * * * *